United States Patent
Bell (10) Patent No.: US 11,242,012 B1
(45) Date of Patent: Feb. 8, 2022

(54) ATTACHABLE HOLDER FOR A MOBILE DEVICE

(71) Applicant: Jason Bell, Louisville, KY (US)

(72) Inventor: Jason Bell, Louisville, KY (US)

(*) Notice: Subject to any disclaimer, the term of this patent is extended or adjusted under 35 U.S.C. 154(b) by 16 days.

(21) Appl. No.: 16/841,885

(22) Filed: Apr. 7, 2020

(51) Int. Cl.
*B60R 11/02* (2006.01)
*B60R 11/00* (2006.01)

(52) U.S. Cl.
CPC .......... *B60R 11/0241* (2013.01); *B60R 11/00* (2013.01); *B60R 2011/007* (2013.01); *B60R 2011/0031* (2013.01); *B60R 2011/0077* (2013.01)

(58) Field of Classification Search
CPC ............................ B60R 11/0241; B60R 11/00
USPC .................................................. 224/183, 567
See application file for complete search history.

(56) References Cited

U.S. PATENT DOCUMENTS

| | | | | |
|---|---|---|---|---|
| 4,057,181 A | * | 11/1977 | Finnigan | B60R 22/00 224/280 |
| 5,668,869 A | * | 9/1997 | Zinno | H04M 1/05 379/446 |
| 5,711,469 A | * | 1/1998 | Gormley | A45F 5/02 224/236 |
| 6,273,467 B1 | * | 8/2001 | Berke | B60R 22/14 280/751 |
| D489,890 S | * | 5/2004 | Gorham, Jr. | D2/639 |
| D507,872 S | * | 8/2005 | Watson | D3/218 |
| 6,922,876 B2 | * | 8/2005 | Kobayashi | B60R 11/02 24/633 |
| 6,945,503 B2 | * | 9/2005 | Cohen | G09F 7/04 224/183 |
| 7,084,819 B2 | * | 8/2006 | De La Torre Barreiro | H01Q 1/245 343/702 |
| 7,374,142 B2 | * | 5/2008 | Carnevali | F16M 13/00 224/183 |
| D572,901 S | * | 7/2008 | St. George | D2/639 |
| 8,068,888 B2 | * | 11/2011 | Ross, III | A45F 5/02 455/575.8 |
| 8,428,665 B1 | * | 4/2013 | McLaughlin | H04M 1/05 455/575.1 |

(Continued)

FOREIGN PATENT DOCUMENTS

| | | | | |
|---|---|---|---|---|
| EP | 1422107 A1 | * | 5/2004 | ......... B60R 11/0241 |
| GB | 2347303 A | * | 8/2000 | ......... B60R 11/0241 |

*Primary Examiner* — Nathan J Newhouse
*Assistant Examiner* — Lester L Vanterpool
(74) *Attorney, Agent, or Firm* — Sanchelima & Associates, P.A.; Christian Sanchelima; Jesus Sanchelima (57) ABSTRACT

A cell phone holder for use with an automotive seatbelt. The device is to be attached to a seatbelt strap using a hook and loop fastener, a magnet or two-sided tape attachment methods. Magnets of the device hold a cell phone in place while in use. A magnetic plate with an adhesive side is provided to be attached to a back end of the mobile device. The magnetic plate is then received by the holder to facilitate a secure attachment. The holder may be provided in several embodiments, one embodiment may include a holder having a slit that is then mounted onto the seatbelt. Another embodiment may be provided as a foldable holder that folds over the seatbelt and is then secured through a provided fastener. Yet another embodiment may include a holder having butterfly clutch clips on a back end to be attached to the seatbelt.

14 Claims, 6 Drawing Sheets

(56) References Cited

U.S. PATENT DOCUMENTS

| | | | | |
|---|---|---|---|---|
| 8,818,465 | B1 * | 8/2014 | Gorham, Jr. | H04B 1/3888 |
| | | | | 455/575.1 |
| D737,806 | S * | 9/2015 | Gail | D14/253 |
| 9,819,377 | B1 * | 11/2017 | Singh | H04B 1/3877 |
| 10,237,384 | B2 * | 3/2019 | Holder | B60R 11/0241 |
| 2008/0110951 | A1 * | 5/2008 | Lauri | B26B 5/006 |
| | | | | 224/584 |
| 2011/0132950 | A1 * | 6/2011 | Culver | B60R 11/0241 |
| | | | | 224/485 |
| 2011/0192857 | A1 * | 8/2011 | Rothbaum | F16M 11/041 |
| | | | | 220/694 |
| 2014/0243051 | A1 * | 8/2014 | Hooks Griffin | A45F 5/00 |
| | | | | 455/575.6 |
| 2016/0106202 | A1 * | 4/2016 | Ford | H04N 19/50 |
| | | | | 224/267 |
| 2017/0196314 | A1 * | 7/2017 | Glick | A44B 11/003 |
| 2018/0251080 | A1 * | 9/2018 | McLaughlin | B60R 11/0241 |
| 2019/0307234 | A1 * | 10/2019 | Martinez | A45F 5/08 |

* cited by examiner

ATTACHABLE HOLDER FOR A MOBILE DEVICE

BACKGROUND OF THE INVENTION

1. Field of the Invention

The present invention relates to a holder for a mobile device and, more particularly, to a holder for a mobile device that is attachable to a seatbelt of a vehicle, the holder magnetically attaches to an adhesively attached metal plate provided for the mobile device.

2. Description of the Related Art

Several designs for a cellphone holder have been designed in the past. None of them, however, include a cell phone holder for use with an automotive seatbelt. The device is to be attached to a seatbelt strap using a hook and loop fastener, magnet or two-sided tape attachment methods. Magnets of the device hold a cell phone in place while in use. A magnetic plate with an adhesive side is provided to be attached to a back end of the mobile device. The magnetic plate is then received by the holder to facilitate a secure attachment. The holder may be provided in several embodiments, one embodiment may include a holder having a slit that is then mounted onto the seatbelt. Another embodiment may be provided as a foldable holder that folds over the seatbelt and is then secured through a provided fastener. Yet another embodiment may include a holder having butterfly clutch clips on a back end to be attached to the seatbelt. Each of the embodiments include holders having magnets on the front end. It is known that individuals often need a safe location to place their mobile device when operating an automotive vehicle. The mobile device may be easily misplaced and lost within a vehicle and may possibly serve as a distraction to a driving individual. Therefore, there is a need for a holder that is attachable to a seatbelt to provide a safe mounting place for a driving individual.

Applicant believes that a related reference corresponds to U.S. Pat. No. 5,711,469 issued for a portable phone pouch, mounting and usage system. The cited reference includes a pouch body utilizing a closure strap to seal the top opening of the pouch with a hook and loop material fastening piece. Applicant believes that another related reference corresponds to U.S. patent publication No. 2014/0243051 issued for a cell phone case. The cited disclosure includes a device for holding a mobile device in a hands-free configuration so that the user can talk and listen to then cellphone without using their hands. However, the cited references differ from the present invention because they fail to disclose the multiple methods for attaching to seatbelts including hook and loop fasteners as well as double sided tape. Additionally, the cited references fail to address the magnets to hold the mobile device to the holder.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an attachable holder for a mobile device that is effortlessly attached to a seatbelt of a vehicle to provide a comfortable setting to hold a user's mobile device while driving.

It is another object of this invention to provide an attachable holder for a mobile device that may be provided in various embodiments to best suit an individuals' needs.

It is still another object of the present invention to provide an attachable holder for a mobile device that is easily removable to allow it to be reused on seatbelts for multiple vehicles.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed a holder 10 which basically includes a body assembly 20 and an attachment assembly 40.

Figure 5:
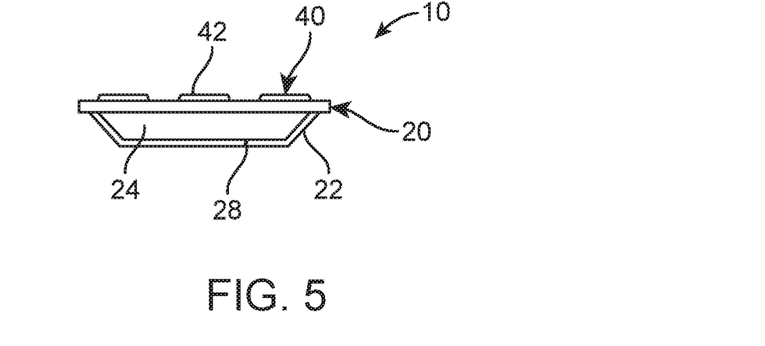
FIG. 5 shows a top view of holder 10 in accordance to an embodiment of the present invention.

Body assembly 20 includes a body 22 having a front end 22A and a back end 22B. In one embodiment, body 22 is provided having a rectangular shape with four perimeter sides and a predetermined thickness. Additionally, body 22 may be made of a plastic or metal material. Furthermore, body 22 additionally contains an interior space 26 which may be accessed through openings 24. In one embodiment openings 24 are located at a top end and a bottom end of body 22. Furthermore, openings 24 may have a trapezoidal shape. Additionally, back end 22B may have a rectangular profile that is smaller than front end 22A which then results in the mentioned trapezoidal shape. A clear view of this shape may be observed in FIG. 5 of the provided drawings. Interior space 26 is further accessed by a slit 28 located on back end 22B of body 22. In one implementation, slit 28 may be provided as a vertical slit which extends along the entire length of back end 22B. Slit 28 may be located along a center portion of back end 22B or may be positioned on any other location along back end 22B.

Figure 1:
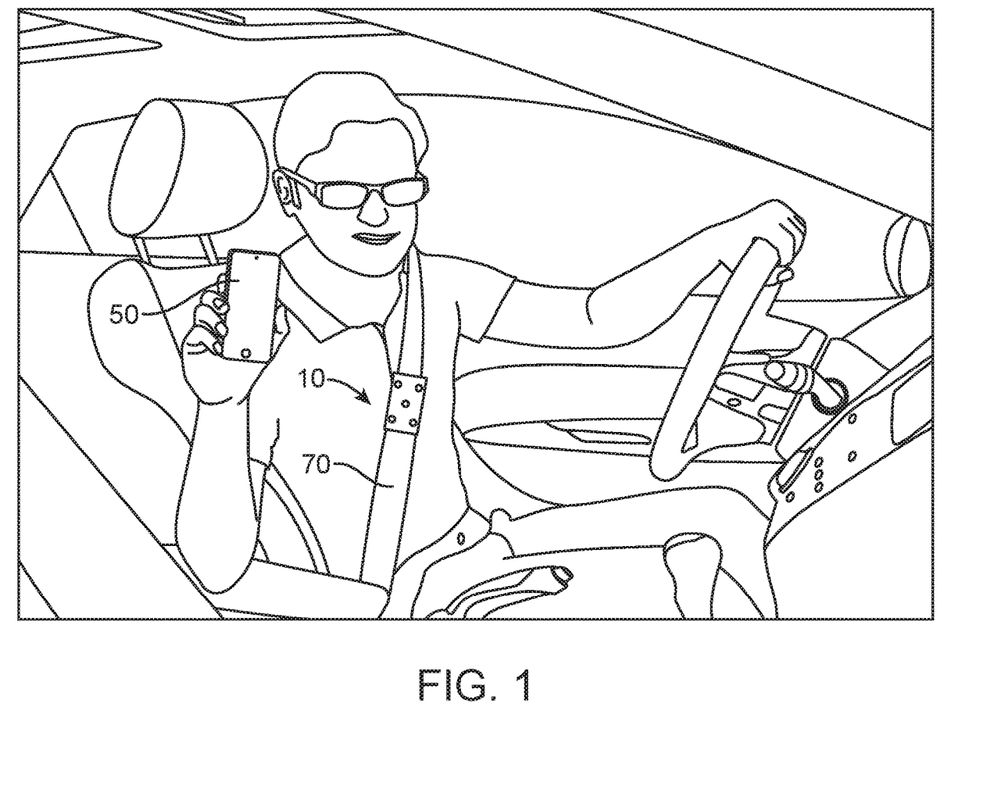
FIG. 1 represents an isometric operational view of holder 10 attached onto a seatbelt 70 of a vehicle in accordance to an embodiment of the present invention.
Figure 3:
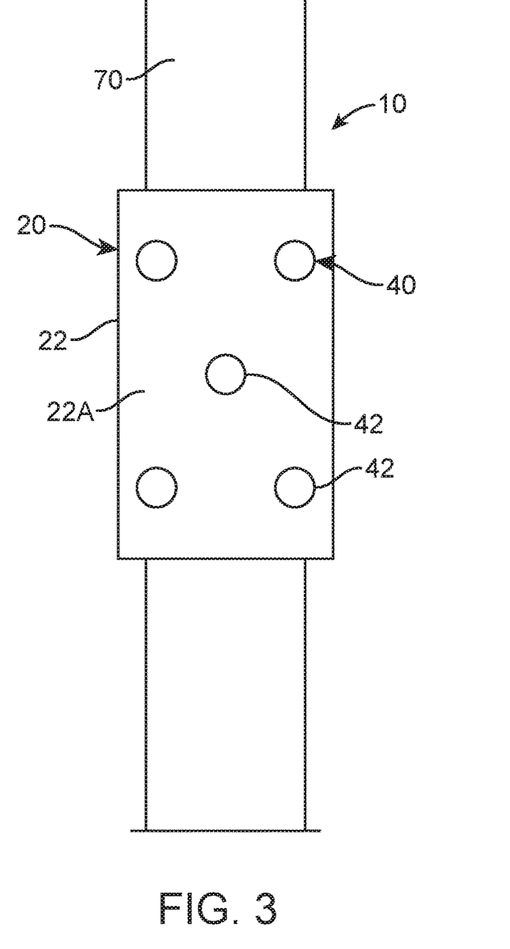
FIG. 3 illustrates a front view of holder 10 attached to seatbelt 70 in accordance to an embodiment of the present invention.
Figure 4:
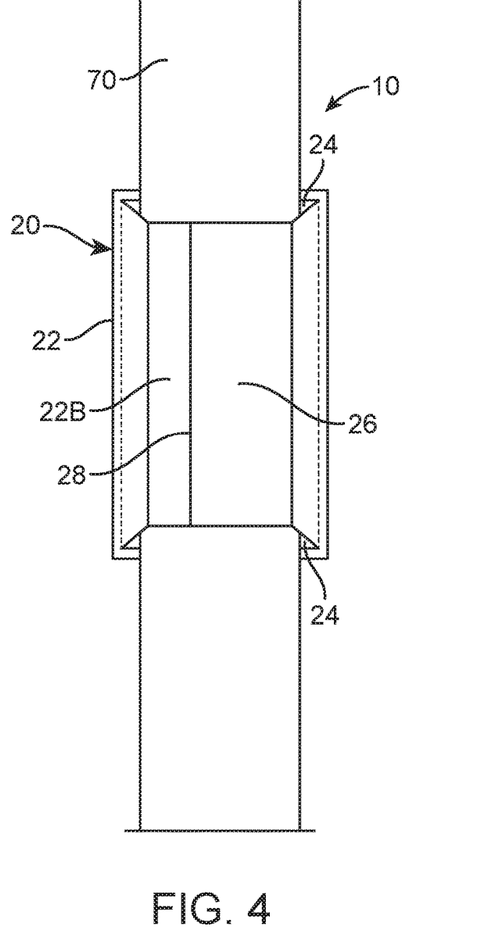
FIG. 4 is a representation of a rear view of holder 10 attached to seatbelt 70 in accordance to an embodiment of the present invention.

In the present embodiment, holder 10 is configured to be attached to a seat belt 70 and hold a mobile device 50. FIGS. 1, 3, and 4 observe holder 10 mounted onto seatbelt 70 located within a vehicle. As observed in FIG. 1, mobile device 50 may be mounted specifically onto a diagonal section of seatbelt 70. An edge of seatbelt 70 is received by slit 28 to then provide access to interior space 26 for seatbelt 70. In one embodiment, seatbelt 70 fits snugly within interior space 26. However, seatbelt 70 should fit within seatbelt 70 such that it may be slid along seatbelt 70 to be properly adjusted by a user.

Figure 2:
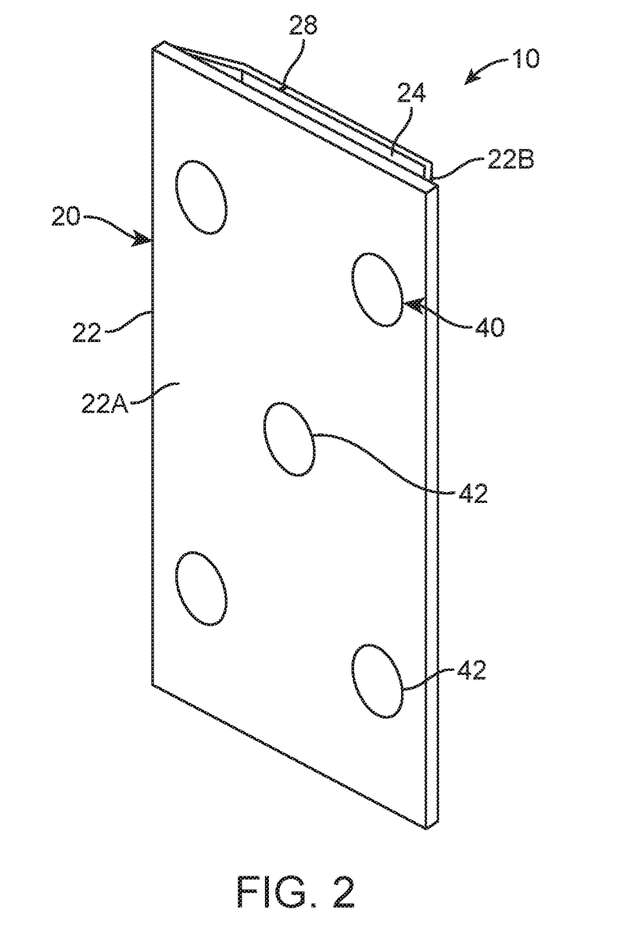
FIG. 2 shows an isometric view of holder 10 having body assembly 20 and attachment assembly 40 in accordance to an embodiment of the present invention.

Holder 10 is configured to hold mobile device 50 on front end 22A. This is achieved through attachment assembly 40. Attachment assembly 40 includes magnet members 42 which are attached to a front end 22A of body 22. In one embodiment, magnet members 42 are integrally mounted onto body 22. In another embodiment, magnet members 42 are provided as removable components of front end 22A. Furthermore, as observed in FIG. 2, five magnet members 42 may be provided on front end 22A. In one embodiment, these five magnet members 42 may be provided having a circular shape and are equally spaced apart to be able to cover an ample surface area of front end 22A. In one implementation, magnet members are provided flush with front end 22A of body 22. This aids to achieve a smooth profile for front end 22A which more comfortably receives mobile device 50. Additionally, magnet members 42 may extend within body 22 and may reach a portion of interior space 26.

Figure 6:
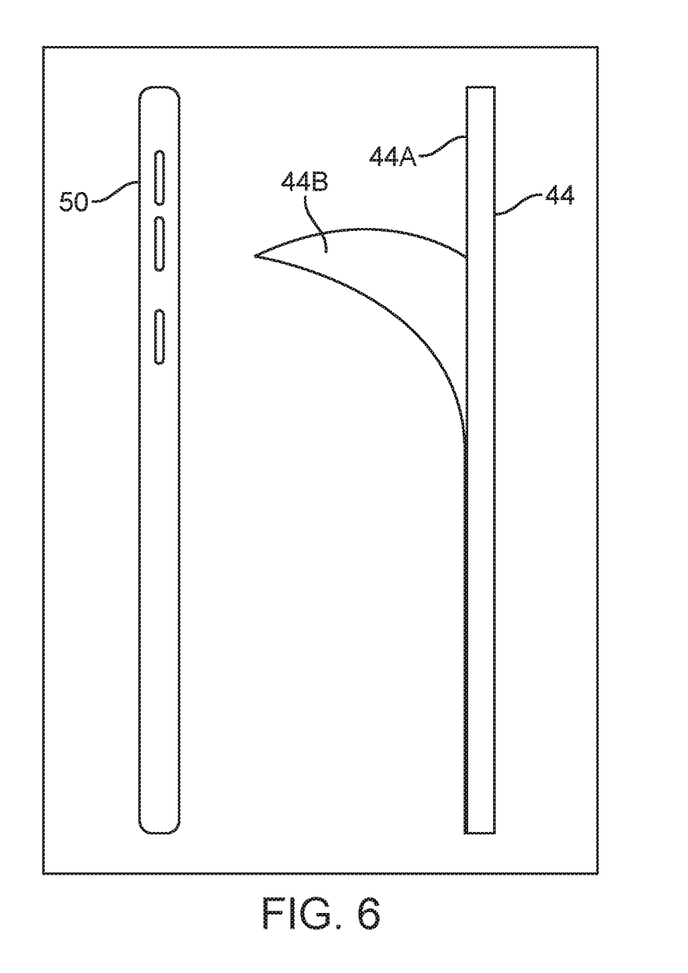
FIG. 6 illustrates a side view of metal plate 44 that is attachable to a mobile device 50 in accordance to an embodiment of the present invention.

Attachment assembly 40 further includes a metal plate 44 which can be observed in FIG. 6 of the provided drawings. In one embodiment, metal plate 44 includes a face side being an adhesive side 44A which is covered by a sheet 44B. Adhesive side 44A includes any suitable adhesive which provides the necessary mounting means needed for attachment assembly 40. Furthermore, sheet 44B is of a suitable dimension to entirely cover adhesive side 44A. Sheet 44B may be made of a plastic material.

In the present implementation, sheet 44B is removed from adhesive side 44A to then mount metal plate 44 onto a rear end of mobile device 50. As a result, mobile device 50 now contains the mounting means necessary to be received by body assembly 20. Metal plate 44 then receives magnet members 42 to create an effective magnetic connection. As a result, mobile device 50 is easily removably mounted from holder 10. This provides a user freedom in handling their phone while driving a vehicle and prevents their phone from being misplaced.

Figure 7:
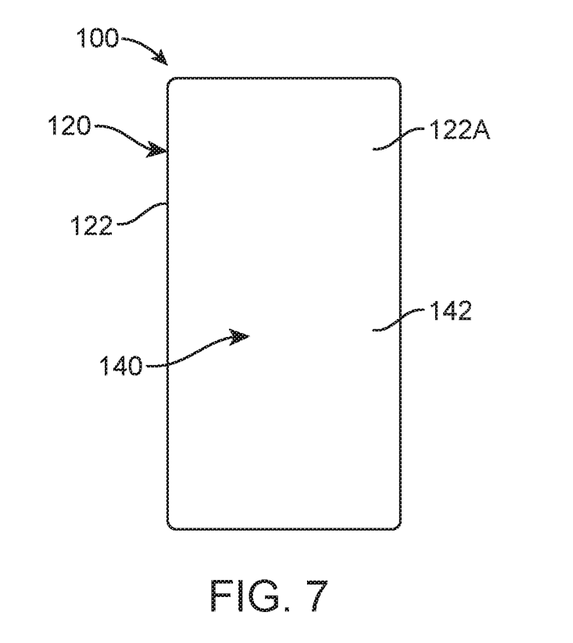
FIG. 7 represents a front view of holder 100 having a magnetic plate 142 in accordance to another embodiment of the present invention.
Figure 8:
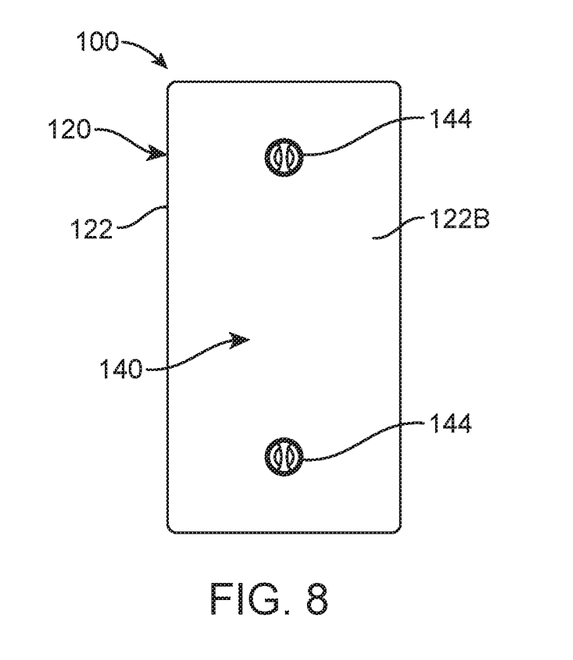
FIG. 8 shows a rear view of holder 100 having pin members 144 in accordance to another embodiment of the present invention.

FIGS. 7 and 8 observe holder 100, representing another embodiment of the present invention. Holder 100 includes body assembly 120 and attachment assembly 140 and works using the same principle described for holder 10.

Body assembly 120 includes a body 122 which includes a front face 122A and a rear face 122B. In one embodiment, body 122 is provided having a rectangular shape and includes four perimeter sides and a predetermine thickness. Additionally, body 122 may be provided having a width that is identical to a width of seat belt 70. Furthermore, body 122 may be made of a plastic or metal material.

Attachment assembly 140 includes a magnetic plate 142 which covers the entirety of front face 122A. Additionally, magnetic plate 142 may be provided as an integral component of body 122. Magnetic plate 142 is configured to receive metal plate 44 previously mentioned that has been attached to mobile device 50. Attachment assembly 140 further includes pin members 144 which are mounted onto rear face 122 of body 122. As observed in FIG. 8, two pin members 144 may be provided in an adjacent and vertical configuration. In one embodiment, pin members 144 are provided as butterfly clutch pins as observed in FIG. 8. However, any suitable type of pin members may be used for attachment assembly 140. Holder 100 is then mounted onto seatbelt 70 through pin members 144 similar to the configuration observed in FIG. 1.

Figure 9:
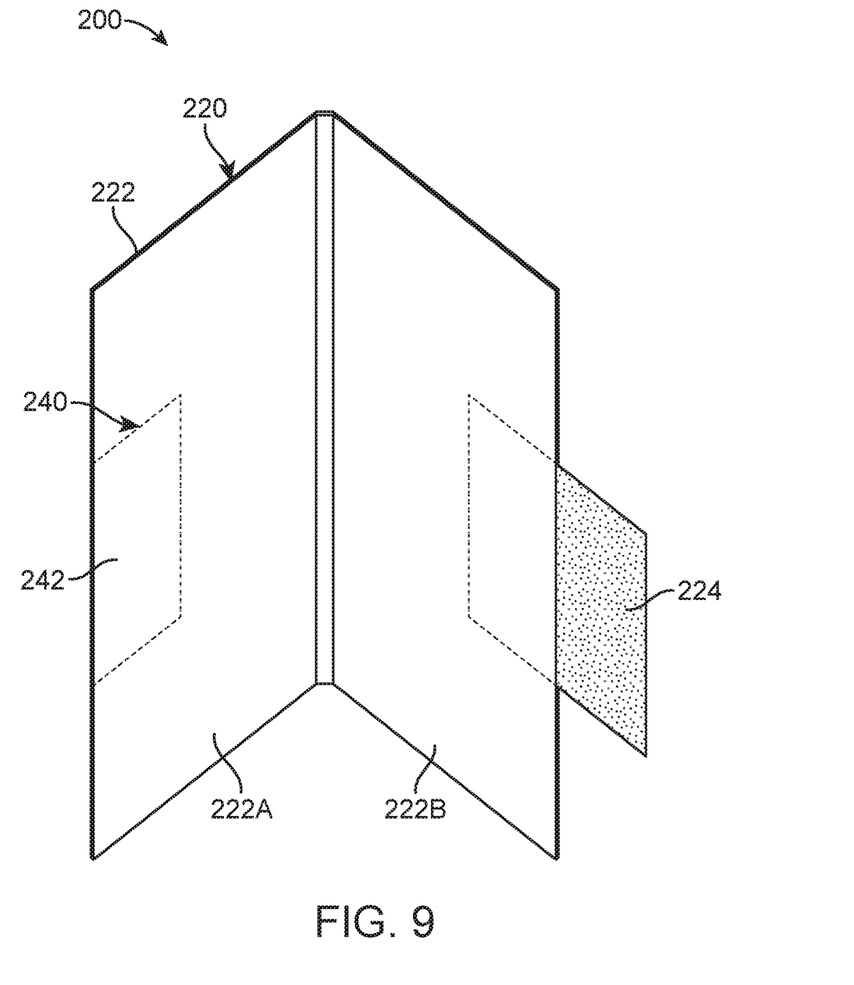
FIG. 9 illustrates an isometric view of holder 200 having flaps 222A and 222B and attachment tape 224 in accordance with yet another embodiment of the present invention.

FIG. 9 represents holder 200, which is a third embodiment of the present invention. Holder 200 includes body assembly 220 and attachment assembly 240. Holder 200 works using the same principles as previously described for the first two embodiments.

Body assembly 200 includes body 22 which includes a first flap 222A and a second flap 222B which are then joined together through a vertical folding center. In the present embodiment, first flap 222A and second flap 222B are folded together to form a single rectangular body. Body 222 is configured to be folded over seatbelt 70 to be mounted thereon. First flap 222A and second flap 222B are then folded and seatbelt 70 is then sandwiched between the rectangular body that is formed. Second flap 222B includes an attachment tape 224 which protrudes from an outer edge. In one embodiment, attachment tape 224 is provided as hook and loop fastener tape. Attachment tape 224 is then received by first flap 222A when in its folded configuration. This provides the necessary mounting means for body 222 onto seatbelt 70. Attachment assembly 240 includes magnetic plate 242 which is mounted to an outer surface of first plate 222A. Magnetic plate 242 may entirely cover first flap 222A and be integrally mounted thereon. Magnetic plate 242 then receives metal plate 44 that has been attached to mobile device 50.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a holder for a mobile device, comprising:
   a. a seatbelt within a vehicle;
   b. a mobile device;
   c. a body assembly including a rectangular body having a front end and a back end, said front end and said back end having a rectangular shape, said front end and said back end being entirely flat, the front end and the back end being entirely solid, wherein the front end is wider and larger than the back end, wherein a left edge of the front end has a first connector portion, said first connector portion having a trapezoidal shape and being entirely solid, wherein a long base of the first connector portion is connected to the left edge of the front end, wherein a short base of the first connector portion is connected to a left edge of the back end, wherein a right edge of the front end has a second connector portion having a trapezoidal shape and being entirely solid, wherein a long base of the second connector portion is connected to the right edge of the front end, wherein a short base of the second connector portion is connected to a right edge of the back end, an interior space between the front end, the back end, the first connector portion and the second connector portion defining a top opening and a bottom opening to access to the interior space of said rectangular body, a vertical slit located on said back end, said seatbelt inserted within said interior space through said vertical slit; and d. an attachment assembly including a plurality of magnet members located on an external surface of said front end, a metal plate with an adhesive located on a face side, said adhesive coupled to a rear end of said mobile device, wherein said metal plate is then magnetically mounted to said plurality of magnet members of said rectangular body.

2. The system for a holder for a mobile device of claim 1 wherein said top opening and said bottom opening have a trapezoidal shape.

3. The system for a holder for a mobile device of claim 1 wherein said vertical slit extends along an entire length of said back end.

4. The system for a holder for a mobile device of claim 1 wherein said plurality of magnet members are circular in shape.

5. The system for a holder for a mobile device of claim 1 wherein said plurality of magnet members extend through said front end to reach a portion of said interior space.

6. The system for a holder for a mobile device of claim 1 wherein said adhesive is covered by a sheet.

7. The system for a holder for a mobile device of claim 1 wherein said plurality of magnet members are flush with said front end of said rectangular body.

8. The system for a holder for a mobile device of claim 1 wherein said holder is mounted to a diagonal section of said seat belt.

9. A system for a holder for a mobile device, comprising:
a. a seatbelt within a vehicle;
b. a mobile device;
c. a body assembly including a solid rectangular body having four perimeter sides and a predetermined thickness, said rectangular body having a front face and a rear face, said rectangular body having a width that matches a width of said seatbelt; and
d. an attachment assembly including a magnetic plate located on said front face of said rectangular body, two pin members located on said rear face of said rectangular body, a first pin member of the two pin members is located on an external surface on a middle portion of a top portion of the rectangular body, a second pin member of the two pin members is located on an external surface on a middle portion of the bottom portion of the rectangular body, wherein said two pin members are then mounted onto said seatbelt, said front face facing outwardly and away from said seatbelt, a metal plate provided with an adhesive side, wherein said adhesive side is received by a rear end of said mobile device, said metal plate coupled to said magnetic plate to create an effective mounting connection.

10. The system for a holder for a mobile device of claim 9 wherein said magnetic plate covers an entire surface of said front face.

11. The system for a holder for a mobile device of claim 9 wherein said at least two pin members are placed in a vertical configuration.

12. The system for a holder for a mobile device of claim 9 wherein said at least two members are butterfly clutch pins.

13. The system for a holder for a mobile device of claim 9 wherein said adhesive side is covered by a sheet.

14. A system for a holder for a mobile device, consisting of:
a. a seatbelt within a vehicle;
b. a mobile device;
c. a body assembly including a rectangular body having a front end and a back end, said front end and said back end having a rectangular shape, said front end and said back end being entirely flat, the front end and the back end being entirely solid, wherein the front end is wider and larger than the back end, wherein a left edge of the front end has a first connector portion, said first connector portion having a trapezoidal shape and being entirely solid, wherein a long base of the first connector portion is connected to the left edge of the front end, wherein a short base of the first connector portion is connected to a left edge of the back end, wherein a right edge of the front end has a second connector portion having a trapezoidal shape and being entirely solid, wherein a long base of the second connector portion is connected to the right edge of the front end, wherein a short base of the second connector portion is connected to a right edge of the back end, an interior space between the front end, the back end, the first connector portion and the second connector portion defining a top opening and a bottom opening to access to the interior space of said rectangular body, wherein the top opening and the bottom opening have a trapezoidal shape, a vertical slit located on said back end, said vertical slit extends along an entire length of said back end, said seatbelt inserted within said interior space through said vertical slit; and
d. an attachment assembly including a plurality of magnet members located on an external surface of said front end, said plurality of magnets having a circular shape, said plurality of magnet members are flush with said front end of said rectangular body, a metal plate with an adhesive located on a face side, said adhesive is covered by a sheet, said adhesive coupled to a rear end of said mobile device, wherein said metal plate is then magnetically mounted to said plurality of magnet members of said rectangular body.

* * * * *